(12) United States Patent
Lumpe et al.

(10) Patent No.: US 6,250,528 B1
(45) Date of Patent: Jun. 26, 2001

(54) ROOF RAIL FOR VEHICLES AND MANUFACTURING PROCESS THEREFOR

(75) Inventors: Karl-Heinz Lumpe, Sprockhövel; Klaus Kolodziei; Herbert Becker, both of Wuppertal, all of (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 09/491,418

(22) Filed: Jan. 26, 2000

(30) Foreign Application Priority Data

Oct. 8, 1999 (DE) .............................. 199 48 475

(51) Int. Cl.$^7$ .................................................. B60R 9/052
(52) U.S. Cl. ................................................. 224/326
(58) Field of Search .................... 224/326, 309, 224/310, 322

(56) References Cited

U.S. PATENT DOCUMENTS

| | | | |
|---|---|---|---|
| 3,719,313 | * | 3/1973 | Tischler .............. 224/42.1 D |
| 4,940,175 | * | 7/1990 | Tittel .................... 224/324 |
| 5,016,799 | * | 5/1991 | Stapleton ............. 224/326 |
| 5,400,938 | * | 3/1995 | Kolodziej et al. ..... 224/321 |
| 5,497,924 | * | 3/1996 | Fisch et al. .......... 224/326 |
| 5,518,157 | * | 5/1996 | Evels et al. ........... 224/309 |
| 5,573,159 | * | 11/1996 | Fisch et al. .......... 224/309 |
| 5,617,981 | * | 4/1997 | Ricker et al. ......... 224/309 |
| 5,715,981 | * | 2/1998 | Blomberg et al. .... 224/326 |
| 5,855,840 | * | 1/1999 | Cucheran et al. .... 264/572 |
| 5,862,964 | * | 1/1999 | Moliner ................ 224/329 |
| 5,871,130 | * | 2/1999 | Cucheran ............. 224/321 |
| 5,893,499 | * | 4/1999 | Lumpe et al. ........ 224/390 |
| 6,089,427 | * | 7/2000 | Evels et al. ........... 224/309 |

FOREIGN PATENT DOCUMENTS

| | | |
|---|---|---|
| 4004829C2 | 2/1992 | (DE) . |
| 4122863A1 | 1/1993 | (DE) . |
| 4223898A1 | 1/1994 | (DE) . |
| 4418528C1 | 6/1995 | (DE) . |
| 44 41 410 C1 | 2/1996 | (DE) . |
| 19528212A1 | 2/1997 | (DE) . |
| 19726912A1 | 1/1999 | (DE) . |
| 19732288A1 | 2/1999 | (DE) . |
| 197 46 225 A1 | 4/1999 | (DE) . |
| 198 32 22 C1 | 11/1999 | (DE) . |
| 08324690 | 6/1998 | (JP) . |

* cited by examiner

Primary Examiner—Stephen P. Garbe
(74) Attorney, Agent, or Firm—Harness, Dickey & Pierce

(57) ABSTRACT

A roof rail for vehicles with a tubular gallery rod (1) and a pair of rail feet (2) which are arranged at its ends, are supported on a vehicle's roof (4). The rail feet (2) are each formed from the same length of material as the gallery rod (1) and consist of bent and flared end sections of the gallery rod (1). The gallery rod (1) has a continuously increasing cross section proceeding from the transition region of one rail foot (2) up to the transition region into the other rail foot (2). A manufacturing process for the roof rail is also disclosed in which a length of extruded material having an expansion fold is formed with arcing end portions. The length of material is then placed in a molding tool and pressurized to expand the material such that it forms a roof rail.

12 Claims, 4 Drawing Sheets

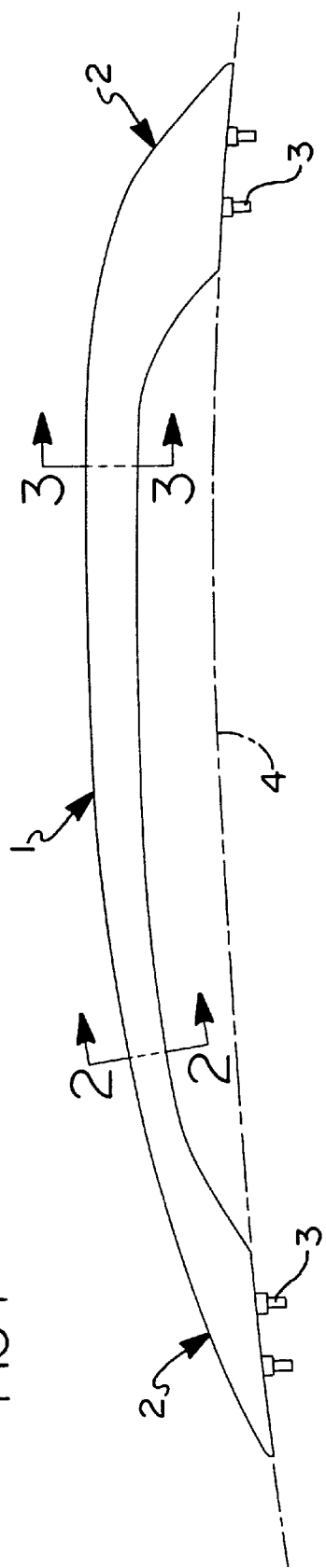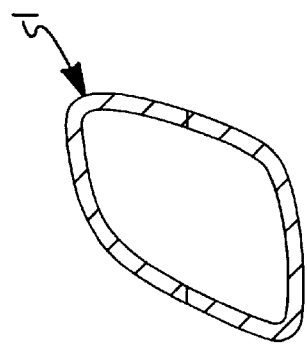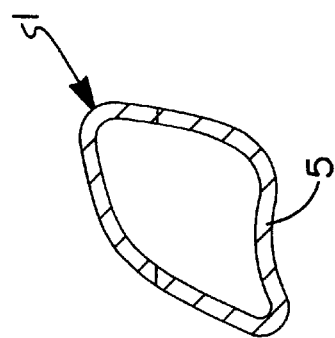

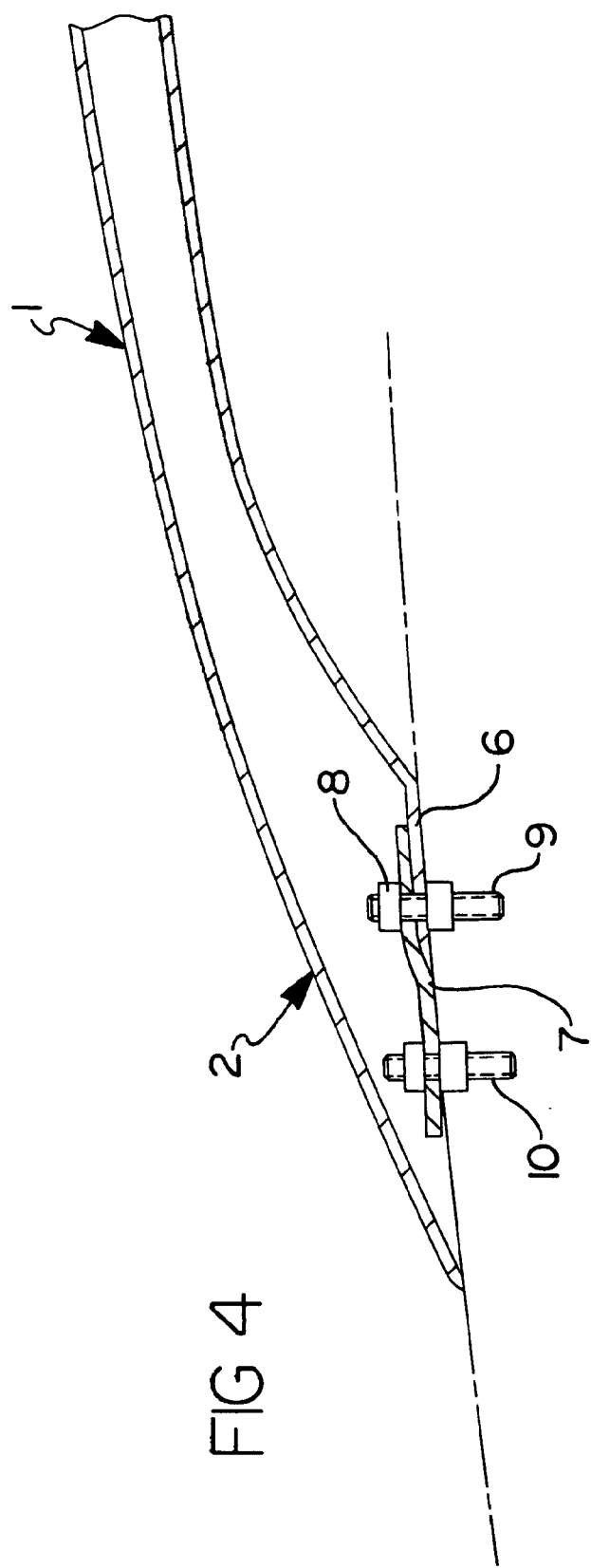

ROOF RAIL FOR VEHICLES AND MANUFACTURING PROCESS THEREFOR

TECHNICAL FIELD

The invention relates to a roof rail for vehicles with a tubular gallery rod and rail feet, which are arranged at its ends, are supported on a vehicle's roof, are each designed as the same piece as the gallery rod, and consist of bent and flared end sections of the gallery rod. The invention also relates to a process for manufacturing such a roof rail.

BACKGROUND OF THE INVENTION

A present day roof rail is shown in DE 42 23898 A1. This well-known roof rail does not adequately meet present day requirements for aerodynamic and stylistic design. The object of the invention is therefore to make available a roof rail which is more aerodynamically efficient and which is more stylistic and attractive in design.

SUMMARY OF THE INVENTION

The above and other objects are solved by a roof rail in accordance with preferred embodiments of the present invention. In accordance with the present invention, a gallery rod thereof has a continuously increasing cross section proceeding from the transition region of one rail foot up to the transition region into the other rail foot or, when viewed from the other end, a continuously diminishing cross section. The roof rail in accordance with the invention is therefore particularly streamlined and also opens many design possibilities to the stylist, because the gallery rod can have any desired cross-sectional profile to begin with, and can be designed in styles such as a round, oval, or square tube.

Advantageously, the roof rail of the present invention can be manufactured by an expansion process. The roof rail of the present invention is also light in weight. The roof rail can also be solidly mounted on the roof of a vehicle and is inexpensive to manufacture.

The roof rail of the present invention can be manufactured particularly simply and economically. In one manufacturing method of the present invention, a tubular extruded member having a continuous trough-shaped bead is employed to form the gallery rod. The bead operates as an expansion fold, thereby providing a supplementary supply of material for expansion of the member during the forming process. Since the bead isn't necessarily completely formed in the region where the gallery rod's cross section is the narrowest, but is completely or partially preserved locally along the length of the roof rail, it is particularly practical to locate it in the region within the internal diameter of an arc portion thereof, because it will point downward when the roof rail is mounted on a vehicle and therefore be hidden from view.

BRIEF DESCRIPTION OF THE DRAWINGS

The various advantages of the present invention will become apparent to one skilled in the art by reading the following specification and subjoined claims and by referencing the following drawings in which:

FIG. 1 is a side view of a roof rail;

FIG. 2 is a cross sectional view in accordance with section line 2—2 in FIG. 1;

FIG. 3 is a cross sectional view in accordance with section line 3—3 in FIG. 1;

FIG. 4 is a vertical cross section through the end region of the roof rail that is on the right in FIG. 1;

DETAILED DESCRIPTION OF THE PREFERRED EMBODIMENTS

Figure 5:
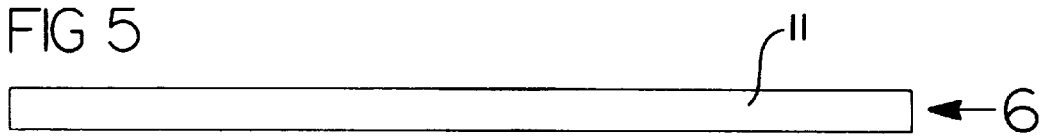
FIG. 5 is a side view of a length of material provided for manufacturing the roof rail.

FIG. 1 shows a roof rail in accordance with a preferred embodiment of the present invention. The roof rail consists of a gallery rod 1 with rail feet 2 arranged at its ends. The roof rail, consisting of the gallery rod 1 and the rail feet 2, is designed as a single piece and is manufactured from a length of material that forms a tubular extruded profile. The rail feet 2 are equipped with fasteners 3 for fastening the roof rail to a vehicle's roof 4.

The rail foot 2 that is on the left in FIG. 1 is designed as more slender and less voluminous than that on the right. For this reason, the gallery rod 1 has a relatively small cross section in the transition region to the left rail foot 2, as in FIG. 2, and a relatively large cross section in the right transition region, as seen in FIG. 3. The gallery rod 1 therefore has a continuously changing cross section. A trough-shaped bead 5, yet to be explained, is on the bottom of gallery rod 1 in accordance with FIG. 2.

FIG. 4 shows one end of the rail foot, in which an axial portion of the gallery rod 1, the rail foot 2 in particular, can be recognized. As can be seen, the rail foot 2 has a bell, which has a steadily increasing diameter from its transition from gallery rod 1 down to the lower attachable end. The rail foot 2 is curved as a whole and has one end facing the roof 4. A foot plate 6, which is part of the same piece as the rail foot 2, locally locks the rail foot 2 at this end. A strong metal strip 7, which can be offset in the shape of steps, as illustrated, is arranged on the floor plate 6. The arrangement utilizes a threaded bolt 9 which can be tightened by a weld nut 8 connected with the strip 7 and, if necessary, which can also be used together with a second threaded bolt 10 to fasten the roof rail to the roof 4. For this purpose, it is obvious that the second rail foot located on the other end of the gallery rod has a design that is the mirror image of that in FIG. 4.

Figure 6:
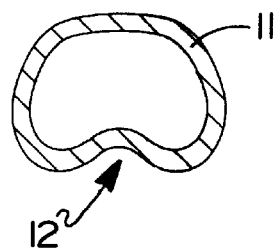
FIG. 6 is an end view of the length of material shown in FIG. 5, taken in accordance with directional line 6.

As mentioned, the roof rail is made from a length of an extruded member. FIGS. 5 and 6 show such a member, which is labeled 11. The member 11 can have any desired cross section within a wide range. FIGS. 2 and 3 show a common cross section for the gallery rod 1. A special feature of the member 11, that has been cut to length from an extruded section of finite length, is that it has a trough-like bead 12 continuously along its length which functions as an expansion fold.

Figure 7:
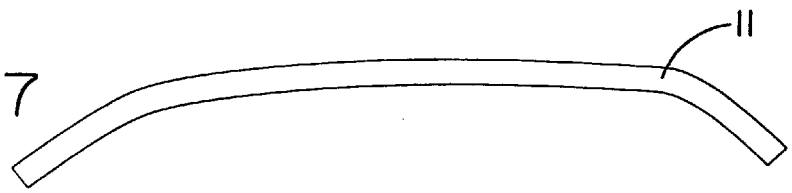
FIG. 7 is a side view of the length of material of FIGS. 5 and 6 in the bent state.
Figure 8:
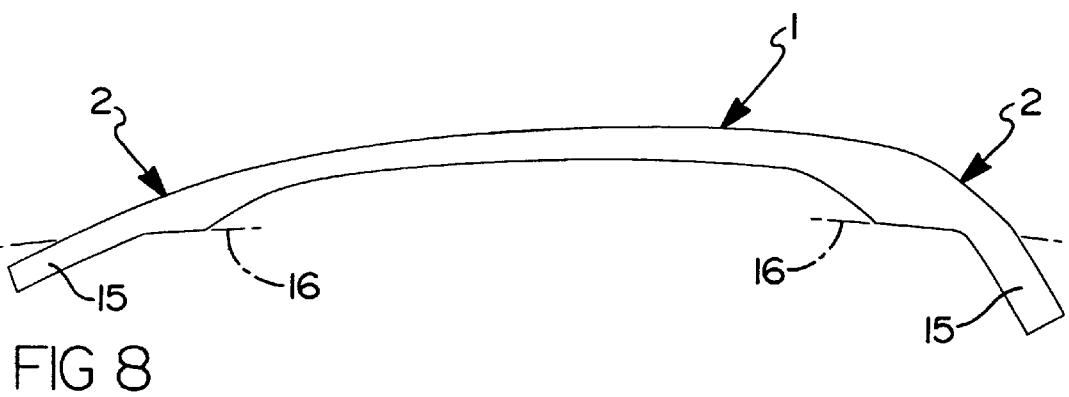
FIG. 8 is a side view of the roof rail just formed from the length of material of FIG. 7.

The following comprises the steps in manufacturing the roof rail according to FIG. 1. First an extruded section of material that has the above described continuous bead 12 is manufactured, preferably out of aluminum or a similar light metal. The member 11 is cut to length from this extruded section of material. The member 11 has a length that is adequate for manufacturing the roof rail, plus an overlength that is needed for the forming process in the region of the rail feet 2. The member 11 is then bent, as shown in FIG. 7, so that there are curved segments on both ends thereof. Care must be taken while bending to ensure that the bead 12 comes to be within the internal diameter of each arc at the ends of the member 11. The member 11 is then placed into the cavity 13 of a forming tool 14 corresponding to the shape of the roof rail to be manufactured. The overall curvature of the member 11 must match the curvature of the cavity 13.

Figure 9:
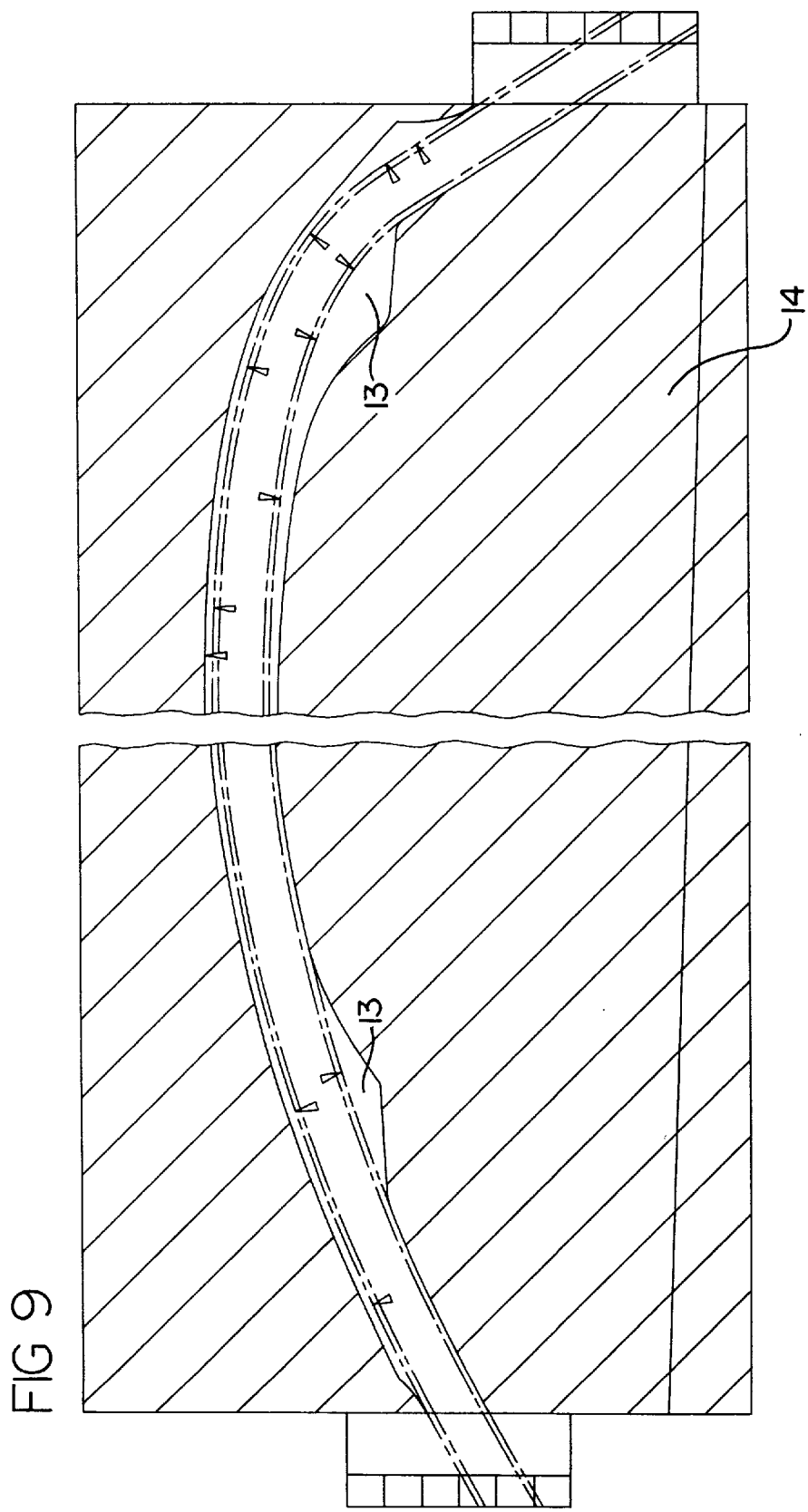
FIG. 9 is the view of a forming mold part for forming the length of material of FIG. 7.

FIG. 9 shows a cover die of a forming tool used to manufacture the roof rail in a more schematic representation. After the forming tool has been closed (attaching the second part of the mold with its corresponding cavity), the member 11 is pressurized by a pressure medium, such as air, oil, or preferably water, and internal high pressure (which can be between 2,000 and 3,000 bar) builds up inside the member 11, causing the member 11 to expand, as indicated by the small arrows in FIG. 9. It may be helpful to apply a suitable lubricant to the member 11 to assist in the expansion process. The continuous trough-like bead helps the expansion of the member 11 because it operates as an expansion fold and makes additional material available as expansion takes place. This also applies to the overlength of the member 11, which supplies material for the formation of the rail feet 2. The forming process terminates as soon as the casing of the member 11 is completely adjacent to the walls of the cavity designed between the parts of the forming tool. The internal high pressure is then reduced again, the forming tool 14 is opened, and the member 11, now formed into a roof rail, is removed from the forming tool 14. Depending on the process, a prolongation 15 remains. After its required removal by a suitable mechanical finishing process along the line 16 that is marked by dots and dashes, it only remains necessary to equip the piece with the fasteners, as illustrated in FIG. 4, and to enhance it visually, possibly by an anodizing process.

It will also be appreciated that the high pressure used to expand the member 11 will usually copy the parting line of the molding tool onto the member 11. This will usually require final finishing, such as by grinding, to remove the parting line.

When using aluminum, it will be noted that wrought aluminum alloys exhibit substantially better reforming properties in the natural aging, soft-state, so that the required strengths are obtained by the elevated temperature age hardening (such as 180° C. for eight hours). Steel and special steel are not heat-treated. A decorative, anti-corrosive surface may also be applied, and the roof rail may be equipped with seals, rubber pads and/or a center support if desired, to aid in securing it to a vehicle.

A roof rail of the described type is arranged on a vehicle's roof in duplicate, whereby each roof rail extends along a longitudinal edge of the roof and is approximately parallel to it.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A roof rail adapted to be secured to an outer body surface of a vehicle, said roof rail comprising:
   an elongated tubular gallery rod;
   a pair of rail feet integrally formed at opposite outermost ends of said gallery rod for supporting said gallery rod above said outer body surface of said vehicle, each of said rail feet forming bending and outwardly flaring components;
   said gallery rod and said rail feet being formed from a single piece of material to form an integrally formed component; and
   said gallery rod increasing continuously in diameter from a first point, at which one of said rail feet merges into said gallery rod, and a second point at which an opposite end of said gallery rod merges into the other one of said rail feet.

2. The roof rail of claim 1, wherein said roof rail is made from a light metal.

3. The roof rail of claim 1, wherein said roof rail further comprises:
   a floor plate integrally formed to project inwardly into an interior area of at least one of said rail feet for assisting in securing said at least one said rail foot to said outer body surface of said vehicle.

4. The roof rail of claim 3, further comprising a fastener strip adapted to engage said floor plate and further adapted to be secured to said outer body surface by a bolt to thereby hold said at least one said rail foot to said outer body surface.

5. The roof rail of claim 1, wherein said gallery rod and said rail feet are formed from a continuous length of tubular material having a trough-like bead extending along at least a major portion of the length of said tubular material to facilitate expansion of said length of tubular material during a forming process by which said roof rail is formed.

6. The roof rail of claim 5, wherein said roof rail is formed by the injection of a pressurized fluid into an interior area of said tubular length of material having curved end portions.

7. The roof rail of claim 6, wherein said pressurized fluid comprises a fluid under a pressure of between about 2,000–3,000 bar.

8. The roof rail of claim 7, wherein said pressurized fluid comprises a fluid under a pressure of about 2,500 bar.

9. A roof rail adapted to be secured to an outer body surface of vehicle, said roof rail comprising:
   an elongated, tubular gallery rod;
   a pair of rail feet integrally formed with said gallery rod at opposite ends of said gallery rod;
   a first one of said rail feet having a continuously, smoothly increasing diameter providing said first rail foot with an outwardly flaring appearance;
   a second one of said rail feet having a cross section which increases in diameter to produce an outwardly flaring appearance;
   wherein said tubular gallery rod increases continuously, smoothly in cross sectional shape from a first point adjacent a first one of said rail feet to a second point adjacent a second one of said rail feet; and
   wherein said roof rail is manufactured from a lightweight metal.

10. The roof rail of claim 9, wherein said gallery rod and said rail feet are formed from a single tubular length of material.

11. The roof rail of claim 10, wherein said single tubular length of material includes a trough-like bead extending at least substantially along a major portion of a length thereof.

12. The roof rail of claim 11, wherein said tubular length of material is formed from a blow forming process wherein said trough-like bead helps to facilitate expansion of portions of said tubular length of material to thereby form said roof rail.

* * * * *

UNITED STATES PATENT AND TRADEMARK OFFICE
CERTIFICATE OF CORRECTION

PATENT NO. : 6,250,528 B1
DATED : June 26, 2001
INVENTOR(S) : Karl-Heinz Lumpe et al.

It is certified that error appears in the above-identified patent and that said Letters Patent is hereby corrected as shown below:

<u>Title page,</u>
Inventor: "Kolodziei" should be -- Kolodziej --
References Cited, Germany Patent No. "198 32 22C1" should be -- 198 32 922 C1 --

Signed and Sealed this

Twenty-ninth Day of January, 2002

Attest:

Attesting Officer

JAMES E. ROGAN
*Director of the United States Patent and Trademark Office*